(12) United States Patent
Yuen

(10) Patent No.: US 8,176,992 B2
(45) Date of Patent: May 15, 2012

(54) ELECTRONICALLY CONTROLLED HYDRAULIC SYSTEM FOR AN AGRICULTURAL IMPLEMENT

(75) Inventor: Cory Yuen, Martensville (CA)

(73) Assignee: CNH Canada, Ltd. (CA)

( * ) Notice: Subject to any disclaimer, the term of this patent is extended or adjusted under 35 U.S.C. 154(b) by 173 days.

(21) Appl. No.: 12/789,672

(22) Filed: May 28, 2010

(65) Prior Publication Data

US 2011/0290515 A1    Dec. 1, 2011

(51) Int. Cl.
*A01B 63/00* (2006.01)
*A01B 63/114* (2006.01)

(52) U.S. Cl. .................... 172/452; 172/311

(58) Field of Classification Search ............ 172/2–11, 172/239, 311, 452–459, 467, 478; 60/413, 60/469; 91/518, 520, 522–530, 536
See application file for complete search history.

(56) References Cited

U.S. PATENT DOCUMENTS

| | | | |
|---|---|---|---|
| 3,736,988 A | 6/1973 | Cantral et al. | |
| 4,043,099 A | 8/1977 | Cheatum | |
| 4,738,315 A | 4/1988 | Kinzenbaw | |
| 5,358,055 A | 10/1994 | Long et al. | |
| 5,449,042 A * | 9/1995 | Landphair et al. | 172/456 |
| 5,562,165 A | 10/1996 | Janelle et al. | |
| 5,957,218 A * | 9/1999 | Noonan et al. | 172/239 |
| 5,992,146 A | 11/1999 | Hausman | |
| 6,129,157 A * | 10/2000 | Noonan et al. | 172/239 |
| 6,131,669 A | 10/2000 | Friggstad et al. | |
| 6,220,366 B1 * | 4/2001 | Noonan et al. | 172/311 |
| 6,293,352 B1 | 9/2001 | Hundeby et al. | |
| 6,382,326 B1 | 5/2002 | Goins et al. | |
| 6,516,595 B2 | 2/2003 | Rhody et al. | |
| 6,698,523 B2 | 3/2004 | Barber | |
| 7,140,178 B2 | 11/2006 | Bitter | |
| 7,469,648 B2 | 12/2008 | Bettin | |
| 2008/0093093 A1 | 4/2008 | Sheppard et al. | |

* cited by examiner

*Primary Examiner* — Robert Pezzuto
(74) *Attorney, Agent, or Firm* — Rebecca Henkel

(57) ABSTRACT

A hydraulic control apparatus for a foldable farm includes first hydraulic control system is used to control weight transfer to ground engaging tools mounted to a stationary and foldable wing frame sections. A second hydraulic system is used to fold and unfold the wing sections. A hydraulic control is provided that interfaces with both hydraulic systems to control sequencing of the functions provided by the first and second hydraulic systems. The first and second hydraulic systems have electronically controlled valves to control the flow of hydraulic fluid to various lifting, folding, and down pressure cylinders.

20 Claims, 12 Drawing Sheets

ELECTRONICALLY CONTROLLED HYDRAULIC SYSTEM FOR AN AGRICULTURAL IMPLEMENT

BACKGROUND OF THE INVENTION

The present invention relates generally to farm implements and, more particularly, a hydraulic control system having a single remote hydraulic control.

Modern farmers strive to improve the management of the increasing amounts of farm acres. Improving management requires farmers to be able to quickly prepare the soil and plant seed each season. This haste has driven the need for more efficient and larger agricultural machinery.

Implements such as harrows, packers, or combined harrow-packers are being made with widths exceeding sixty feet in the field operating position. Also, drill implements employed to distribute seed product across an agricultural field are also being made increasingly wider in the field operating position. Wider working widths provide more efficient field working such as by increasing the number of rows that are seeded in a single pass or by increasing the amount of field that is tilled in a single pass. However, as agricultural implements have been made increasingly wider, there has been a need for systems to compactly fold the implement for practical and safe transport over highways and through gates, and for greater maneuverability. These systems typically consist of hydraulic cylinders and valves that are controlled by a remote operator control to fold and unfold the implement.

Moreover, with agricultural implements, such as hoe drills, requiring fluid power (hydraulic) circuits to perform an increasing number of other tasks, a greater number of control interfaces are similarly required. The increased number of control interfaces adds to the complexity of the overall hydraulic system and reduces space within the operator cab of the towing vehicle for the implement for other implement controls. A narrow transport hoe drill, for example, will be capable of performing several hydraulically powered functions, such as raising and lowering the ground engaging tools, e.g., openers, applying a trip force on the ground engaging tools, and setting the amount of packing pressure that is applied by the packer wheels. Additionally, as noted above, the wing sections of the hoe drill, which are mounted to opposite lateral sides of a stationary frame section, are hydraulically folded to a transport position and hydraulically lowered from the transport position to an extended, unfolded position. A down pressure is also typically hydraulically applied to the stationary frame section and the wing sections to prevent the frame sections from pivoting upward due to the resultant force from the ground engaging tools. Moreover, as an air cart is typically used with seeding implements, air cart functions, such as fan operation and seed metering will require hydraulic control.

SUMMARY OF THE INVENTION

The present invention is directed to a hydraulic control apparatus comprised of electronically controlled hydraulic valves for a foldable farm implement that overcomes some of the drawbacks associated with conventional hydraulic systems. The farm implement generally comprises a stationary frame section and a pair of wing sections pivotably mounted to opposed lateral sides of the stationary frame section. A first hydraulic control system is used to control weight transfer to the ground engaging tools mounted to the stationary and wing frame sections. A second hydraulic system is used to fold and unfold the wing sections. A hydraulic control is provided that interfaces with both hydraulic systems to control sequencing of the functions provided by the first and second hydraulic systems.

One of the objects of the invention is to provide a less complex hydraulic control for folding and unfolding wing sections of a foldable farm implement and lowering ground engaging tools of the foldable farm implement to a ground engaging position.

Another object of the invention is to provide a single remote hydraulic control for controlling a first hydraulic system that controls weight transfer to the ground engaging tools and a second hydraulic system that controls folding and unfolding of the foldable wing sections.

It is yet another object of the invention to provide a remote hydraulic control that is operative to disable a first set of hydraulic cylinders that lower the ground engaging tools when the wing sections are being moved to a folded position by a second set of hydraulic cylinders and is further operative to control the second set of hydraulic cylinders to prevent folding the machine when the ground engaging tools are in the ground engaging position.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

Many changes and modifications could be made to the invention without departing from the spirit thereof. The scope of these changes will become apparent from the appended claims.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

Figure 1:
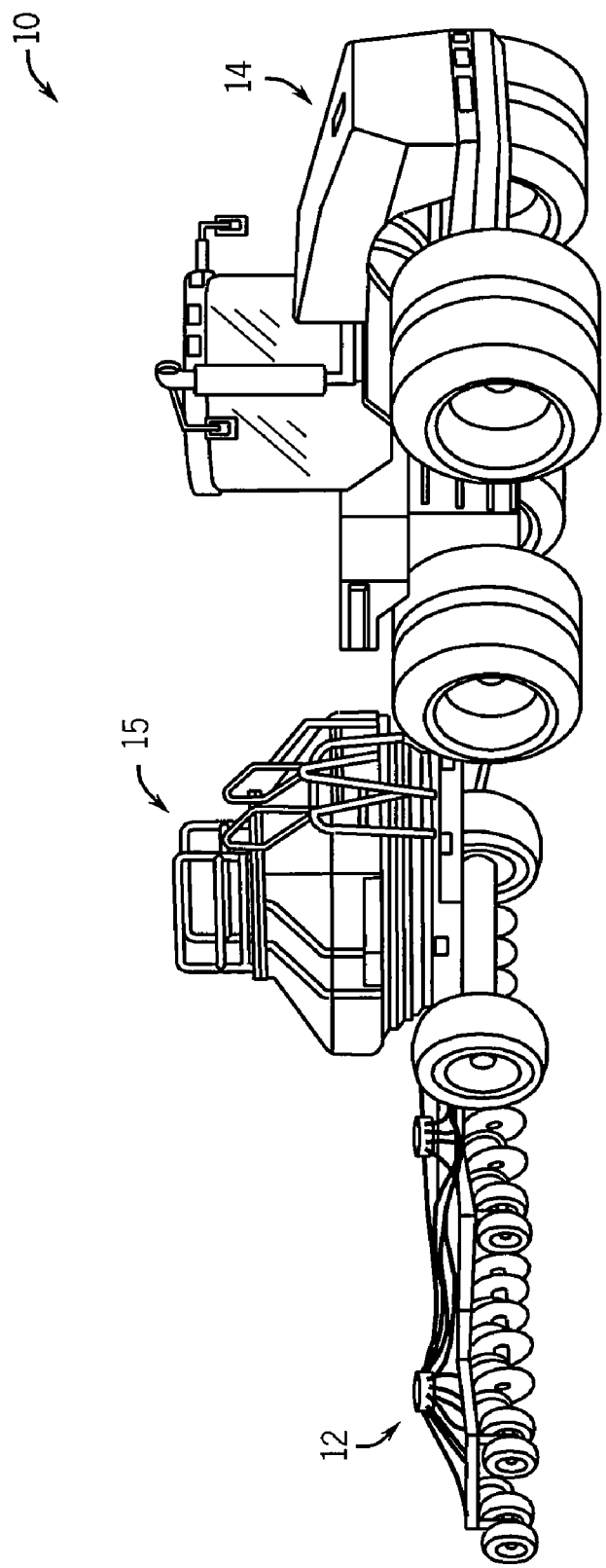
FIG. 1 is a pictorial view of a farm planting system having a farm implement hitched to a prime mover.

Referring now to FIG. 1, a planting system 10 according to one embodiment of the invention includes a foldable implement 12, shown in a field working position, coupled to a prime mover 14, e.g., tractor, in a known manner. The planting system 10 may also include an air cart 15, as known in the art. While the invention is applicable with different types of foldable implements, for purposes of illustration, the invention will be described with respect to a hoe drill.

Figure 2:
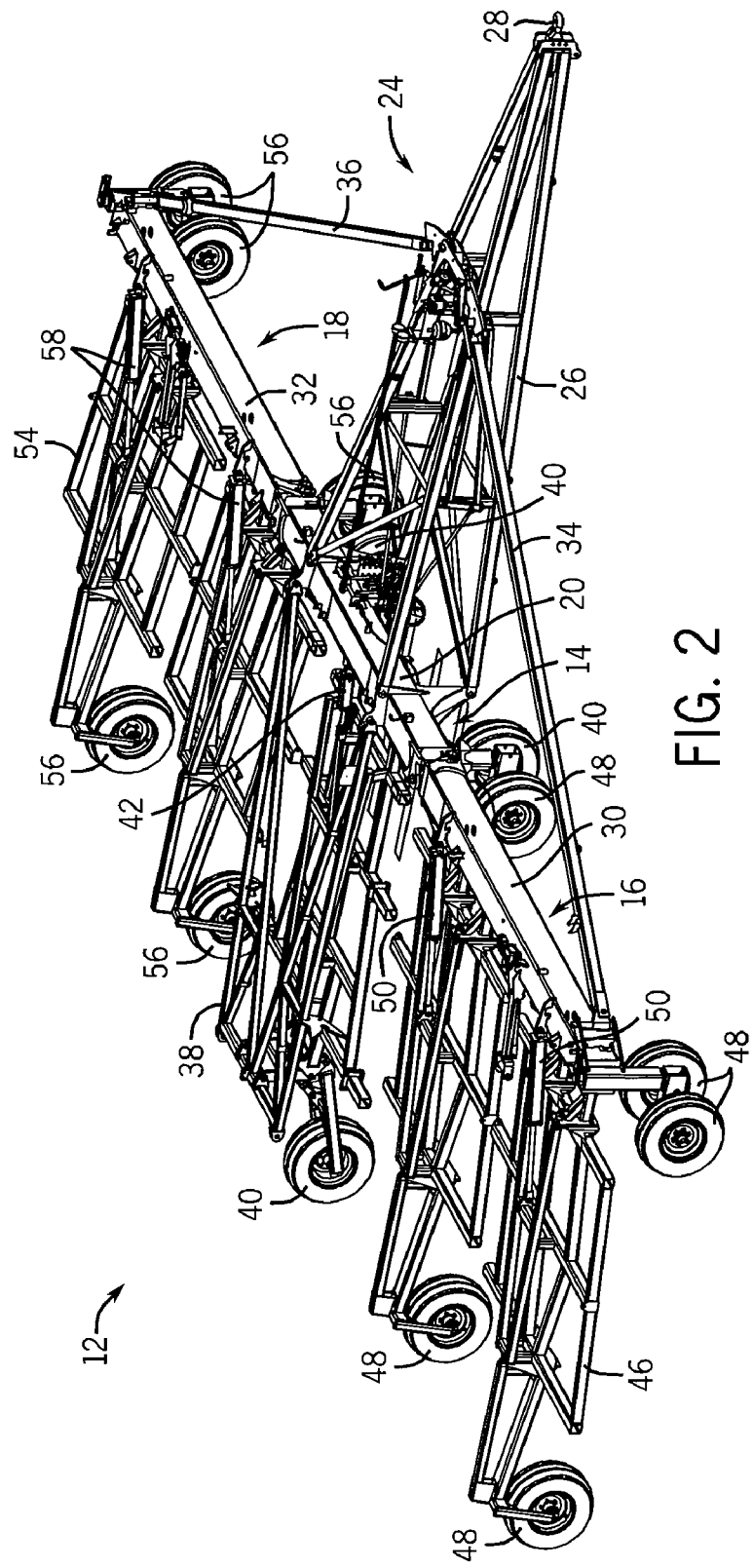
FIG. 2 is a top isometric view of a hoe drill in an unfolded, working position for use with the farm planting system of FIG. 1, and shown without ground engaging tools.
Figure 3:
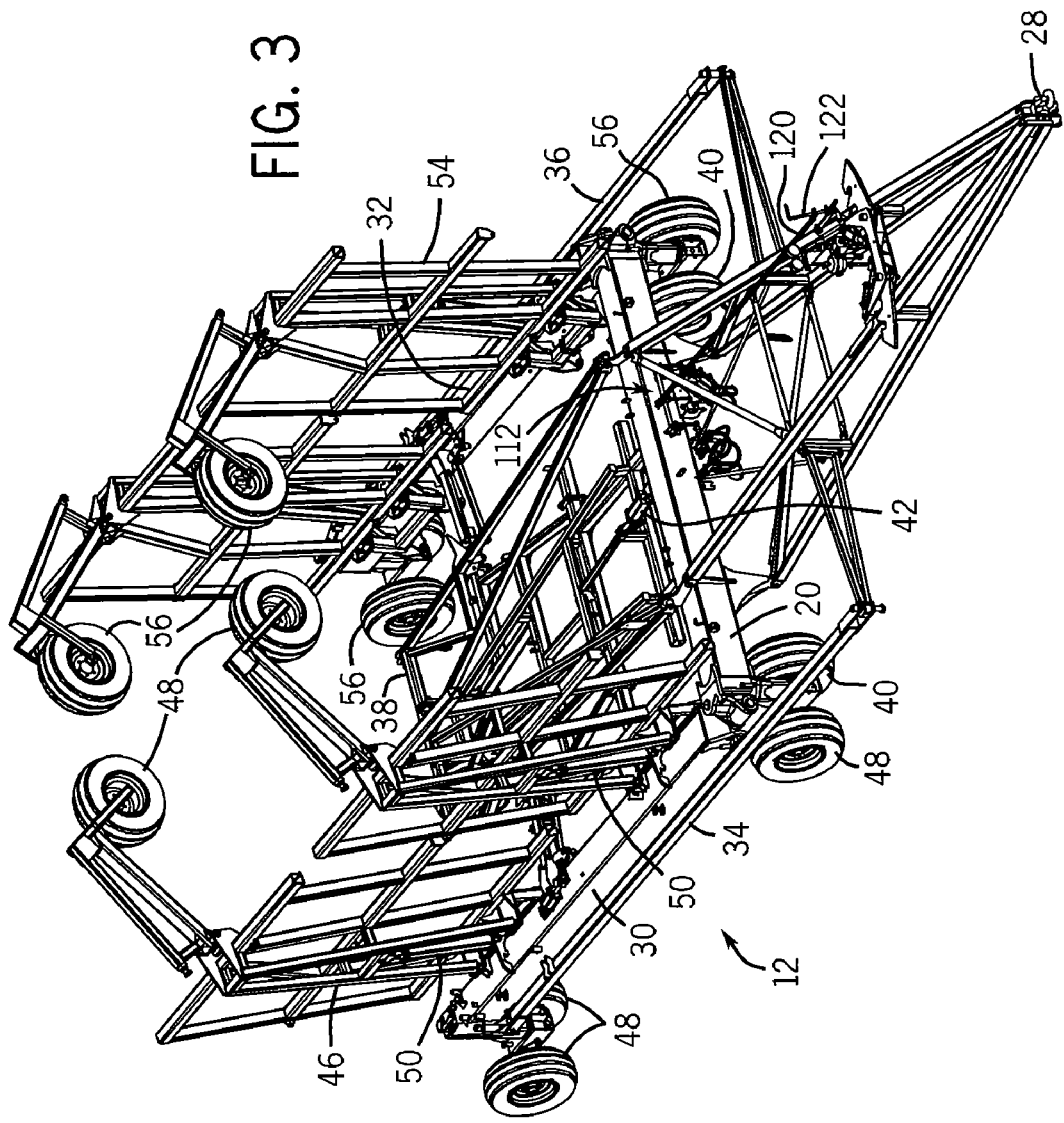
FIG. 3 is an isometric view of the hoe drill in a folded, transport position.

Referring now to FIG. 2, hoe drill 12 has a center frame section 14 and two wing sections 16, 18 pivotally mounted to opposite lateral sides of the center frame section 14. The wing sections 16, 18 are designed to be folded to a transport position in which the wing sections 16, 18 are folded over the center frame section 14 to provide a narrow transport configuration that is suited for transport between crops, fields, and along roadways, as well as storage. FIG. 3 shows the hoe drill 12 in the folded, transport position.

The center frame section 14 has a tool bar 20 to which a tongue section 24 is coupled. The tongue section 24 generally consists of a cage 26 having a distal end coupled to the tool bar 22 and a proximate end forming a hitch point 28 for coupling to the prime mover 14 in a conventional manner. Wing sections 16, 18 have respective booms 30, 32 and draft links 34, 36 are interconnected between the cage 26 and booms 30, 32, respectively. The draft links 34, 36 are pivotally connected to the cage 26 and the wing booms 30, 32 so that as the wing booms 30, 32 are drawn inwardly, the draft links 34, 36 are drawn to a folded position, as shown in FIG. 3.

A center sub-frame 38 is pivotally mounted to the center tool bar 20 and is supported above a field surface by wheel 40. Ground engaging tools (not shown), such as disc openers, may be mounted to the center sub-frame 38 in a known manner. With additional reference to FIG. 4, a downforce cylinder 42 is interconnected between the center tool bar 20 and the center-sub-frame 38. When appropriately activated, the hydraulic cylinder 42 provides a tendency to rotate the center sub-frame 30 about pivot connections 44 to apply a downforce on the sub-frame 38.

Referring again to FIGS. 2 and 4, wing section 16 has a right-hand side sub-frame 46 that is pivotally coupled to the wing boom 30, and is supported above the field surface by wheels 48. Ground engaging tools (not shown) are attached to the sub-frame 46 in a known manner. Interconnected between the wing boom 30 and the sub-frame 46 are lift cylinders 50, and when appropriate actuated, pivot the sub-frame 46 about pivot connections 52 to position the sub-frame generally over wing boom 30. Cylinders 50 also apply a downforce on the sub-frame 46 to lower the openers into engagement with the ground.

In a similar manner, wing section 18 has a left-hand side sub-frame 54 that is pivotally coupled to the wing boom 32, and is supported above the field surface by wheels 56. Ground engaging tools (not shown) are attached to the sub-frame 54 in a conventional manner. Interconnected between the wing boom 32 and the sub-frame 54 are lift cylinders 58 that when actuated, pivot the sub-frame 54 about pivot connections (not shown) to raise the sub-frame 54 over wing boom 32. Cylinders 58 also apply a downforce on the sub-frame 54 to lower the openers into engagement with the ground.

Figure 4:
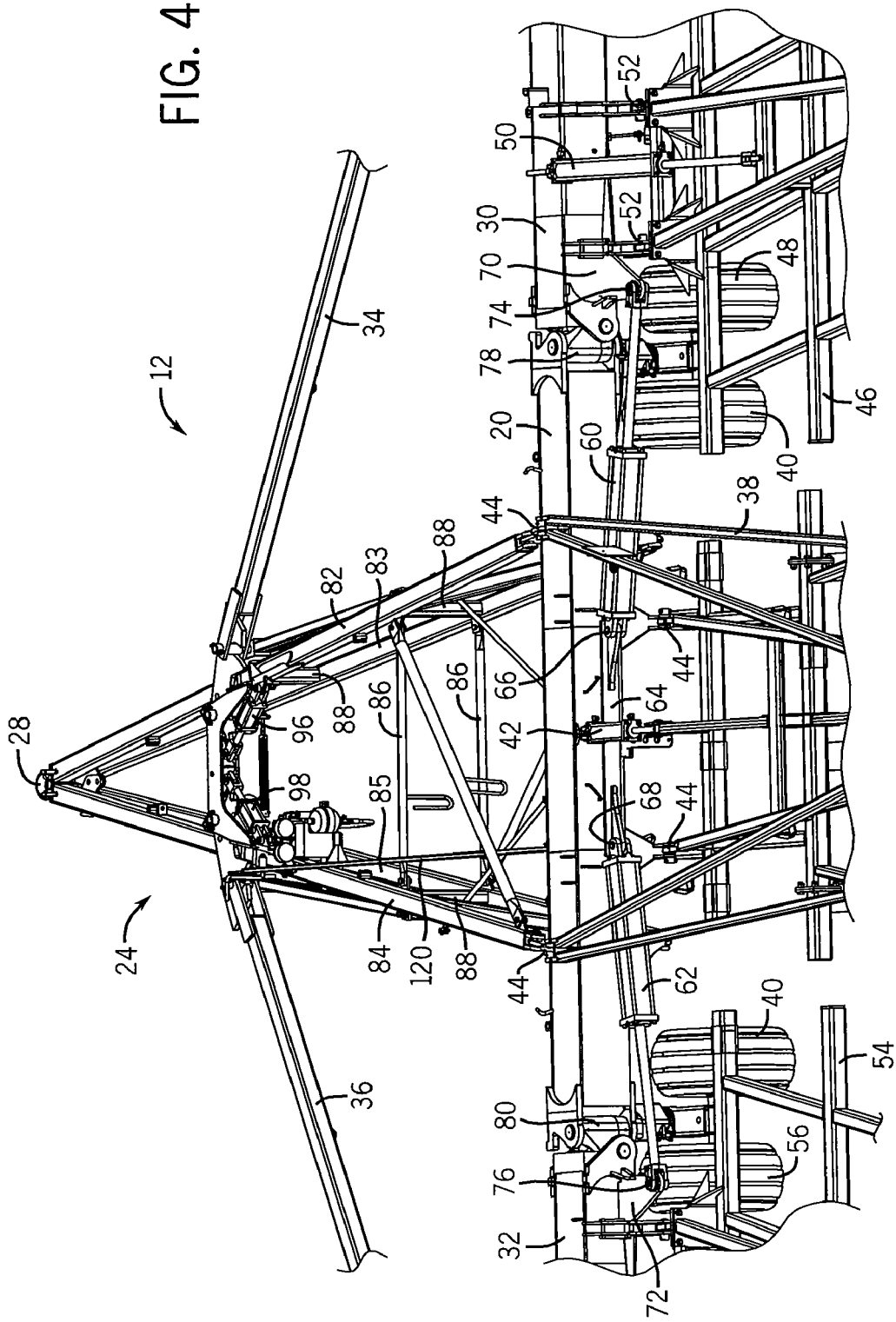
FIG. 4 is a rear isometric view of a front portion of the hoe drill.

As best shown in FIG. 4, the hoe drill 12 also includes a right-hand side folding cylinder 60 and a left-hand side folding cylinder 62. The cylinders 60, 62 are interconnected between the wing booms 30, 32 and center tool bar 20, respectively. More particularly, a mounting flange 64 is formed on the rear surface of the center tool bar 20 and inward ends of the cylinders 60, 62 are pivotally coupled to the mounting flange at pivot points 66, 68, respectively. Outward ends of the cylinders 60, 62 are pivotally coupled to mounting flanges 70, 72, respectively, attached to wing booms 30, 32, respectively, at pivot points 74, 76, respectively. When the cylinders 60, 62 are appropriately actuated, the cylinders 60, 62 pull the wing booms 30, 32 inwardly (rearward) so that the wing booms 30, 32 rotate about knuckles 78, 80 at opposite ends of the center tool bar 20, respectively.

Figure 5:
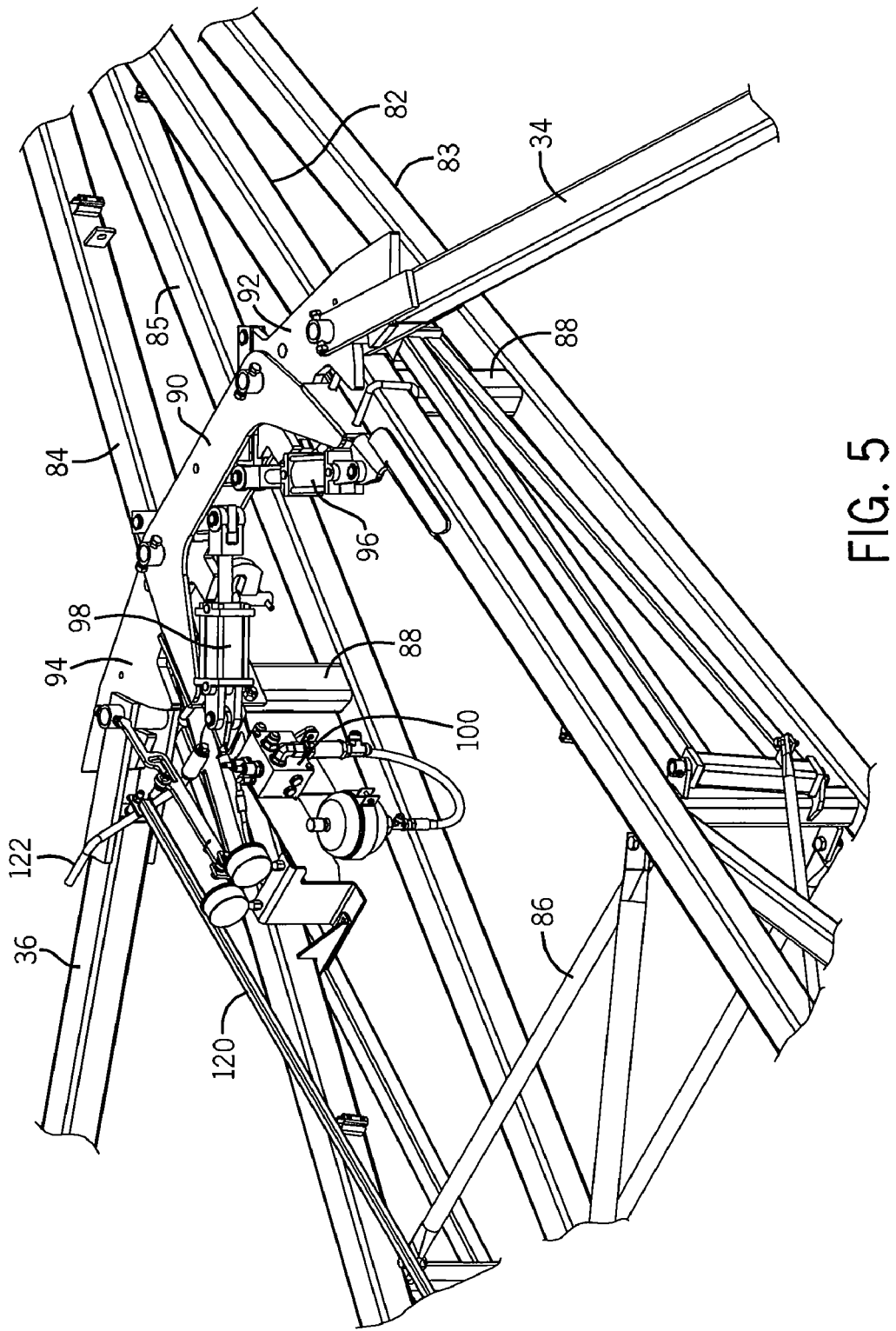
FIG. 5 is an enlarged view of the front portion of the hoe drill.

Now referring to FIG. 4, the cage 24 is formed by two pair of stacked rails 82, 83, 84, and 85 interconnected between center tool bar 20 and hitch point 28. The stacked rails 82, 83, 84, and 85 are angled inwardly from their connection with the tool bar 20 to the hitch point 28 so that the cage 24 has a generally triangular form. The cage 24 also includes a number of cross-bars 86 and posts 88 providing support for the stacked rails 82, 83, 84, and 85. As best shown in FIG. 5, the cage 24 includes a swing mount 90 that is interconnected between the pair of stacked rails. A pair of links 92, 94 are pivotally coupled to the swing mount 90 and hook around forward ends of the arms 34, 36. Swing cylinders 96, 98 are interconnected between the links 92, 94, respectively, and upper rails 82 and 84, respectively. Thus, when the cylinders 96, 98 are actuated, the links 92, 94 are rotated so as to open and release arms 34, 36 allowing the arms 34, 36 to follow the wing sections 16, 18 as they pivot about knuckles 78, 80. The flow of hydraulic fluid to cylinders 96, 98 is controlled by V4 and V8, or 2A and 2B depending on schematic. See FIGS. 8 and 9.

Figure 6:
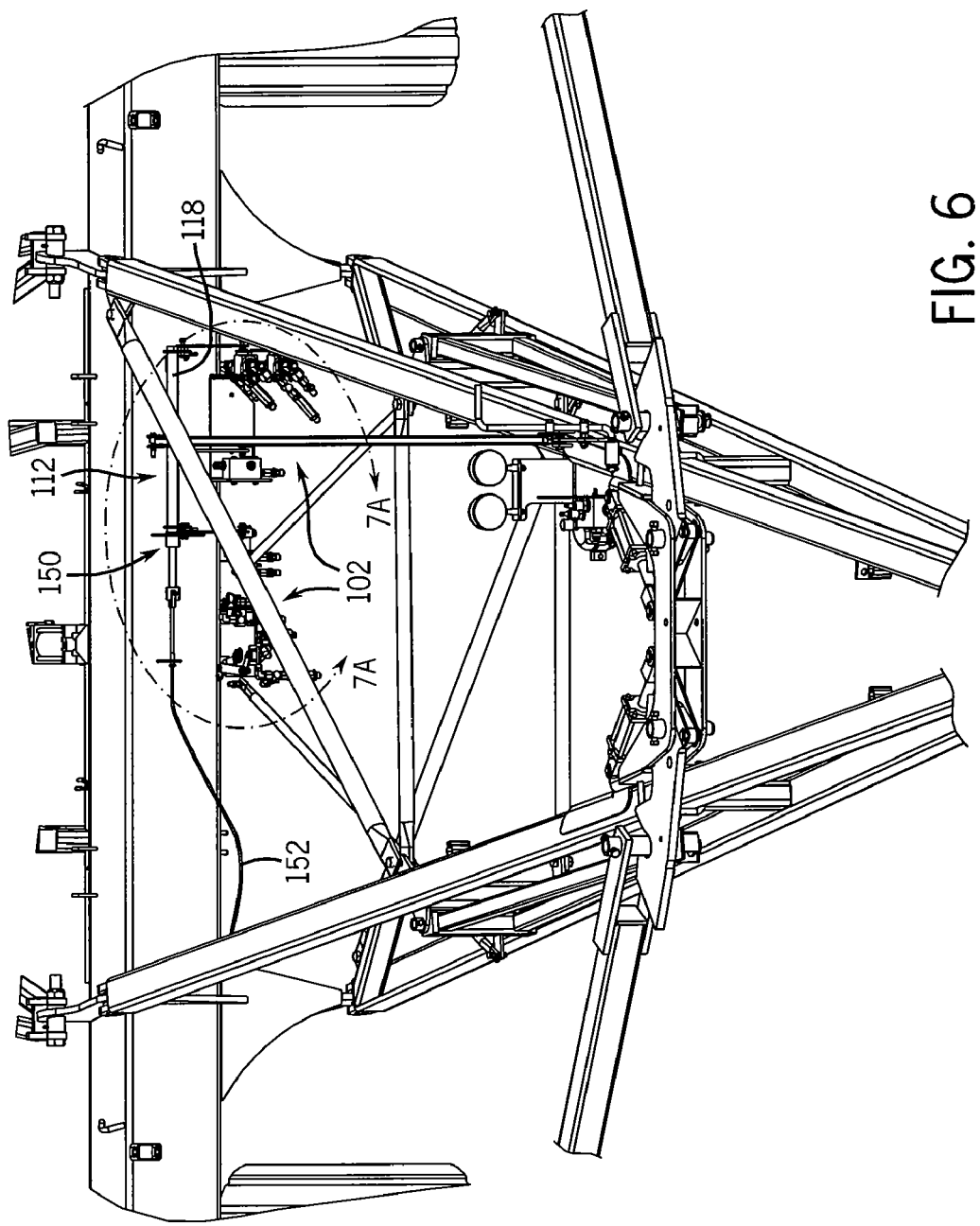
FIG. 6 is a front isometric view of a center section of the hoe drill.
Figure 7A:
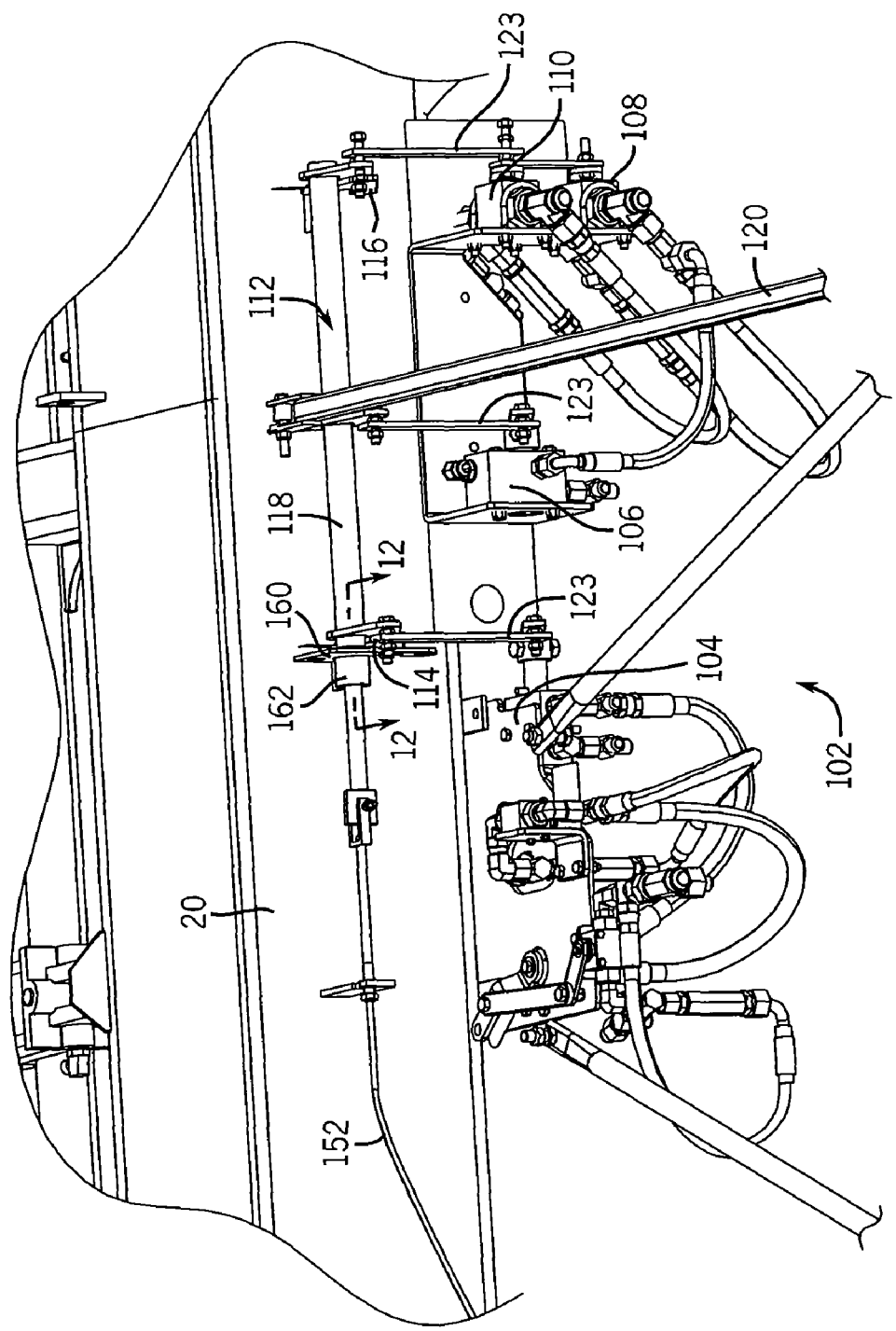
FIGS. 7A and 7B are isometric views of a valve lockout arrangement according to one aspect of the present invention.

As shown in FIG. 6, a series of valve bodies, generally designated by reference numeral 102, control the flow of hydraulic fluid to cylinders 42, 50, 58, 60, and 62. The valve bodies 102 are mounted to respective mounting brackets (not numbered) that are in turn are attached to, or integrally formed with, the center tool bar 20. In this regard, the valve bodies 102 are positioned forward of the center tool bar 20. For the sake of simplicity, the conduits interconnecting the valve bodies 102 and the cylinders 42, 50, 58, 60, and 62 are not shown, but it is understood that the fluid connection between the valve bodies and the cylinders via such fluid conduits to be within the skill of one in the art. As best shown in FIG. 7A, the valve bodies 102 include valve bodies 104, 106, 108, and 110 which are mechanically linked to a rockshaft 112 which is mounted to the center tool bar 20 by a pair of mounting flanges 114, 116. Operation of the valves 104-110 will be described with respect to the schematic of FIG. 8. The rockshaft 112 has a tubular body 118 to which a control link 120 is coupled. The control link 120 has a handle 122, FIG. 5, which enables an operator to remotely rotate the rockshaft 112. When the rockshaft 112 is rotated, the valves within valve bodies 104, 106, 108, and 110 are switched. That is, the valve bodies 104, 106, 108, and 110 are mechanically coupled to the rockshaft 112 by linkages 123.

Figure 8:
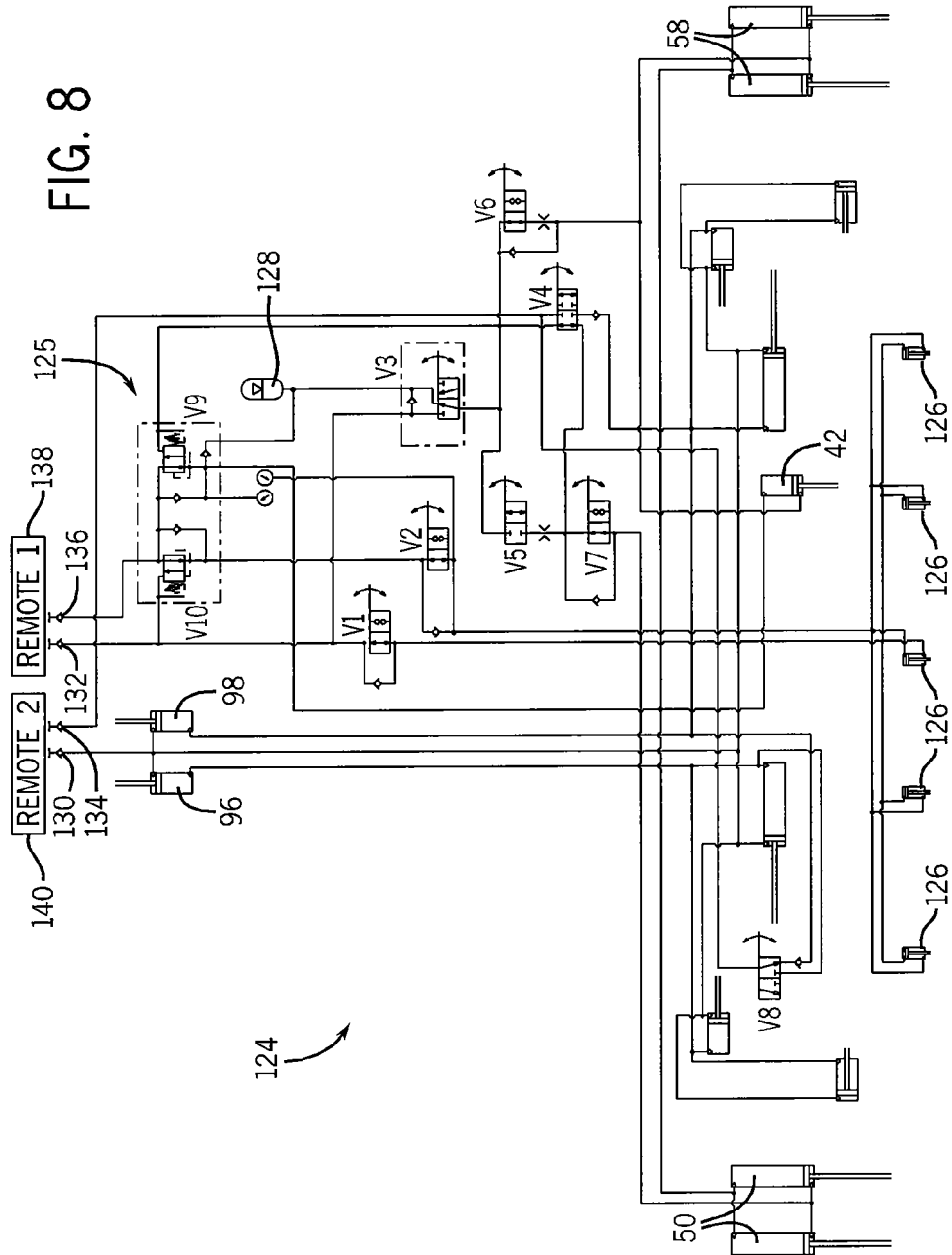
FIG. 8 is a schematic representation of a first preferred hydraulic control system for the hoe drill.

FIG. 8 is schematic of the hydraulic circuit for controlling raising and lowering and folding and unfolding of the hoe drill 12. The circuit 124 includes a set of pressure reducing/relieving valves 125 that control the hydraulic pressure on the base end of the tool frame cylinders 42, 50, and 58, and the opener cylinders 126. Valves V1, V2, V3, and V4 are contained within valve bodies 108, 110, 106, and 104, respectively. Valves V1, V2 are used to lock out the opener cylinders when the drill 12 is not in the working (field) position. In this regard, when valves V1, V2 are closed the openers cannot be lowered. Valve V3 is in the left position when the machine is in the working position. This is required to allow hydraulic fluid to return from the rod end to the base of the tool frame cylinder 42, 50, 58, and so fluid can return to accumulator 128. Valve V4 allows fluid to pass to and from the hydraulic system (not shown) of the prime mover, e.g., tractor. It will thus be appreciated that the hydraulic circuit 124 has a pair of supply ports 130, 132 and return ports 134, 136.

In the embodiment illustrated in FIG. 8, the hydraulic circuit 124 includes two sub-circuits. A frame circuit for controlling the sequencing of the folding and unfolding of the drill as well as raising and lowering the openers, and a swing circuit for controlling swinging the wing booms inward to the transport position and outward to the working position. Each sub-circuit is activated by separate remote controls 138 and 140.

In this regard, when the operator desires to fold the implement, the operator moves the control lever 120 to the transport position, which results in rotation of the rockshaft. With rotation of the rockshaft, valves V1, V2 are moved to the closed position, valve V3 is in the right hand position, and valve V4 is in the right hand position. Then using the remote control, the operator can commence folding of the drill. More particularly, the right-hand side of the drill is first raised by activating remote 138. The operator can swing the right-hand side wing boom 16 inward using remote control 140. This causes V5 to open, and V6 to close. The left-hand side of the drill may now be rotated upward so that the left-hand side sub-frame is rotated over wing boom 18. This moves V8 to the left position. Wing boom 18 may then be swung inward to place the drill in the transport position shown in FIG. 3. Because valves V6 and V7 are one-way blocking (check) valves when closed, pressure can be supplied to the rod end. This allows the operator to raise the sub-frames if they have lowered due to internal valve leakage.

One skilled in the art will appreciate that to unfold the drill 12 from the transport position to the working position, the operator again uses remote control 138 to commence the unfolding process. First, the left wing boom is pivoted outwardly to the extended position. Thereafter, the left sub-frame, right wing boom, and then right sub-frame are extended and lowered to the position shown in FIG. 2. The operator then moves the control lever 120 to the working setting. This causes rotation of the rockshaft, which in turn causes valves V1 and V2 to open to extend the opener cylinders for lowering the openers into engagement with the ground. Valve V3 is also moved to the open position which allows the sub-frames to move in response to changes in ground contours. Valve V4 is moved to the closed position.

It will be appreciated that the hydraulic circuit 124 provides a controlled sequencing of the folding and unfolding of the drill 12 using a network of shut-off and sequencing valves that are mechanically linked to open and close in a prescribed order. It will further be appreciated that the circuit 124 also permits one hydraulic remote, e.g., remote 138, to be used to control the weight transfer for the sub-frames, ground engaging tool tip force and packing force, in addition to raising and lowering of the sub-frames. More particularly, the pressure control valves include valves V9 and V10 that allow the frame weight transfer and opener tip force to be set at different levels.

Using one remote control for weight transfer and tip and packing force provides a timing benefit. That is, when the openers are lowered and engaged in the ground, weight transfer to the frames should be applied. On the other hand, when the openers are in the raised position, weight transfer should be removed to reduce stress on the sub-frames. By using a single remote, this application and reduction of weight transfer will always occur. Additionally, when folding into the transport position, the openers will be raised fully off the ground before the sub-frames are lifted off the ground. Thus, the possibility of the operator forgetting to raise the openers before transport is avoided. As a result, the circuit 124 ensures that no openers are too low before the drill is folded to the transport position.

In other words, utilizing a single control for the pressure relief sub-circuit and the shut-off/sequencing sub-circuit provides: (1) no weight transfer to the sub-frames will occur until the openers are lowered; (2) all weight transfer to the sub-frames will be removed before the openers are raised; (3) openers will be raised before the sub-frames are raised; and (4) the sub-frames will be lowered before the openers are lowered into ground engagement.

Figure 9:
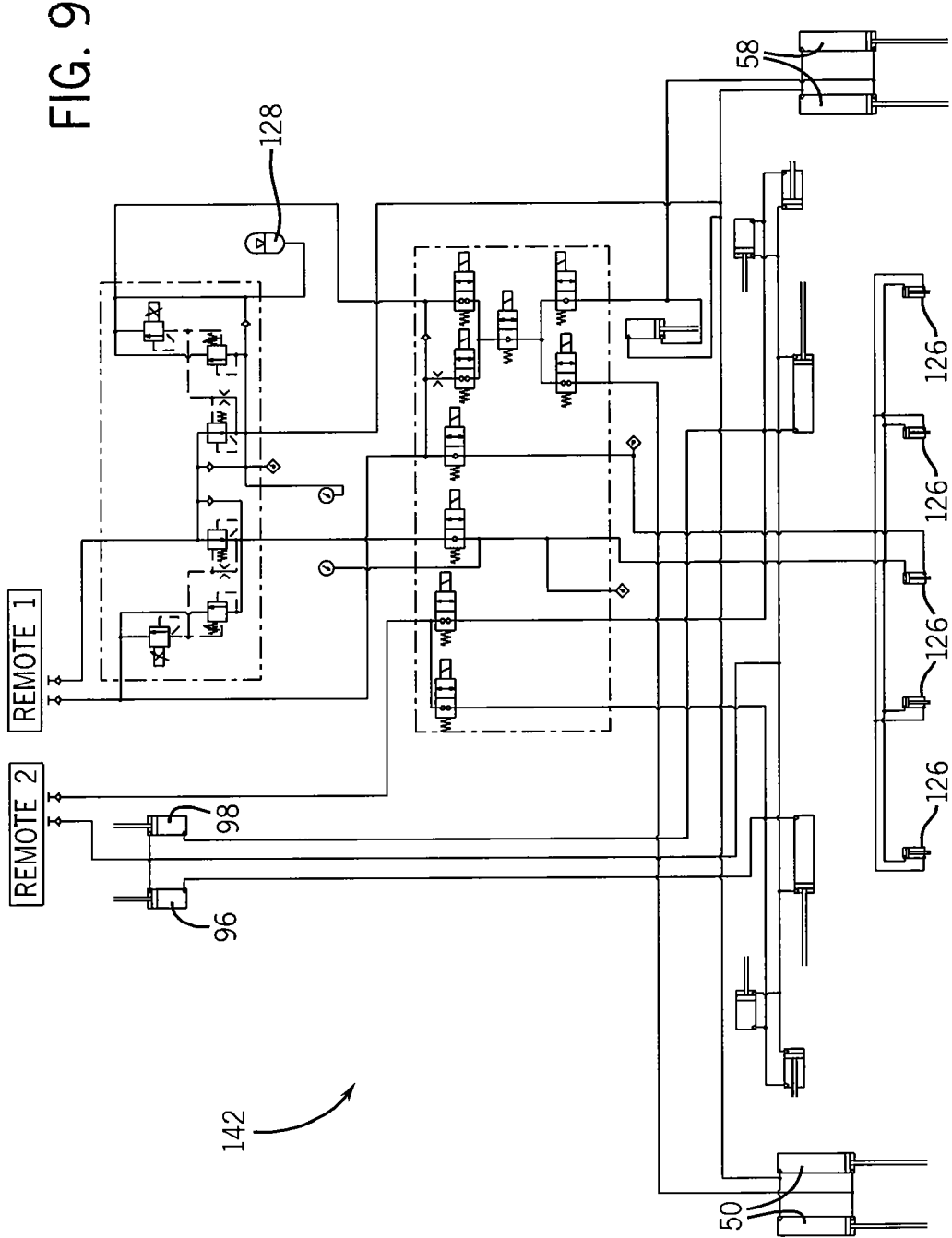
FIG. 9 is a schematic representation of a second preferred hydraulic control system for the hoe drill.

FIG. 9 is a schematic layout of another preferred hydraulic circuit for use with the drill shown in FIG. 2. In this embodiment, the circuit 142 is substantially similar to circuit 124 described above, but utilizes solenoid controlled valves rather than mechanically actuated valves to control the raising and lowering and folding and unfolding of the drill.

Figure 10:
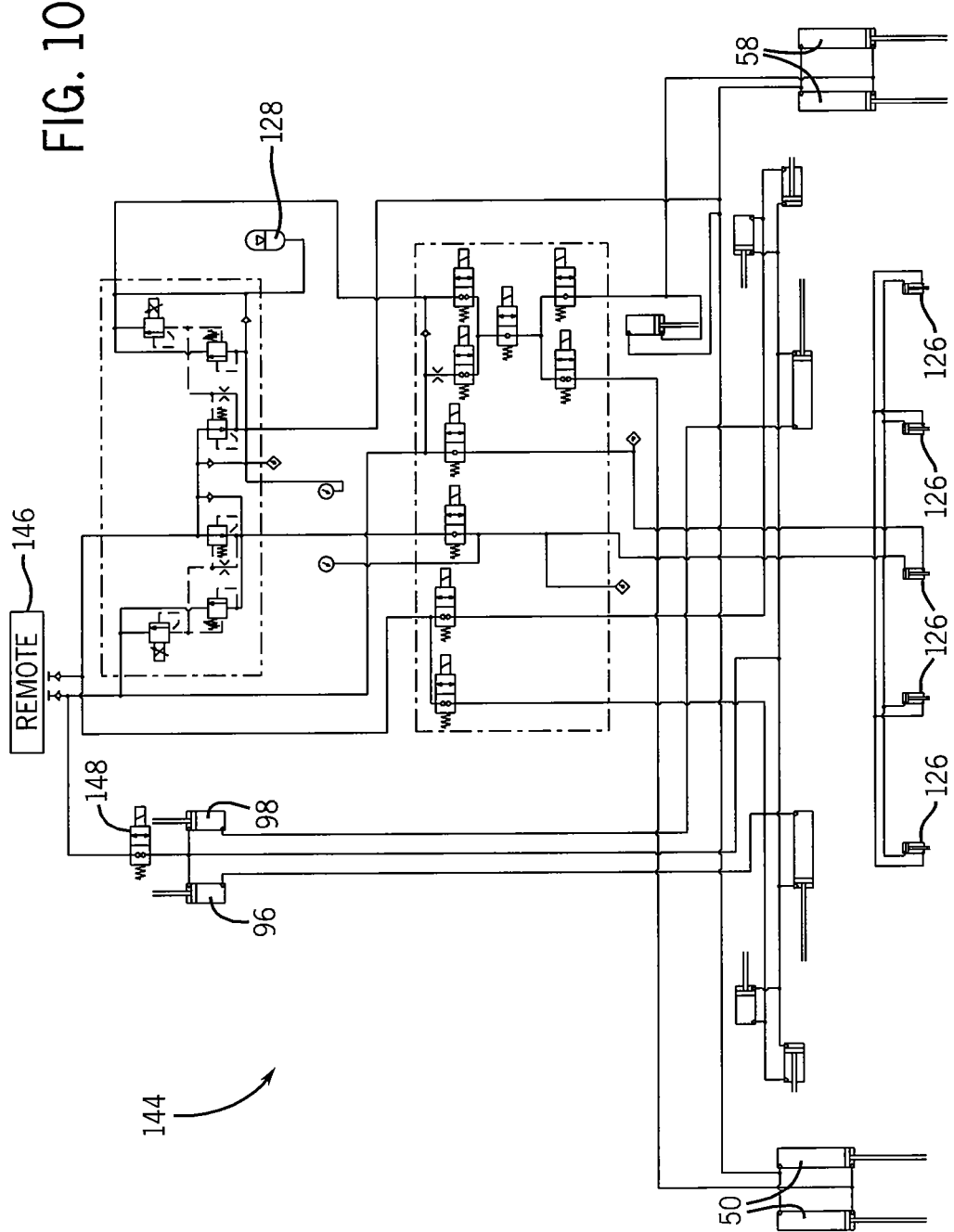
FIG. 10 is a schematic representation of a third preferred hydraulic control system for the hoe drill.

FIG. 10 shows yet another schematic layout of a preferred hydraulic circuit 144 according to another aspect of the invention. In this embodiment, which for purposes of illustration has a layout similar to the circuit of FIG. 9, the swing circuit and the frame circuit are on the same remote 146. Thus, in this embodiment, a single hydraulic remote control may be used to control raising and lowering of the openers, raising and lowering of the sub-frames, and swinging in and out the wing booms. Circuit 144 includes ON/OFF valve 148 to activate/deactivate the swing sub-circuit.

Figure 7B:
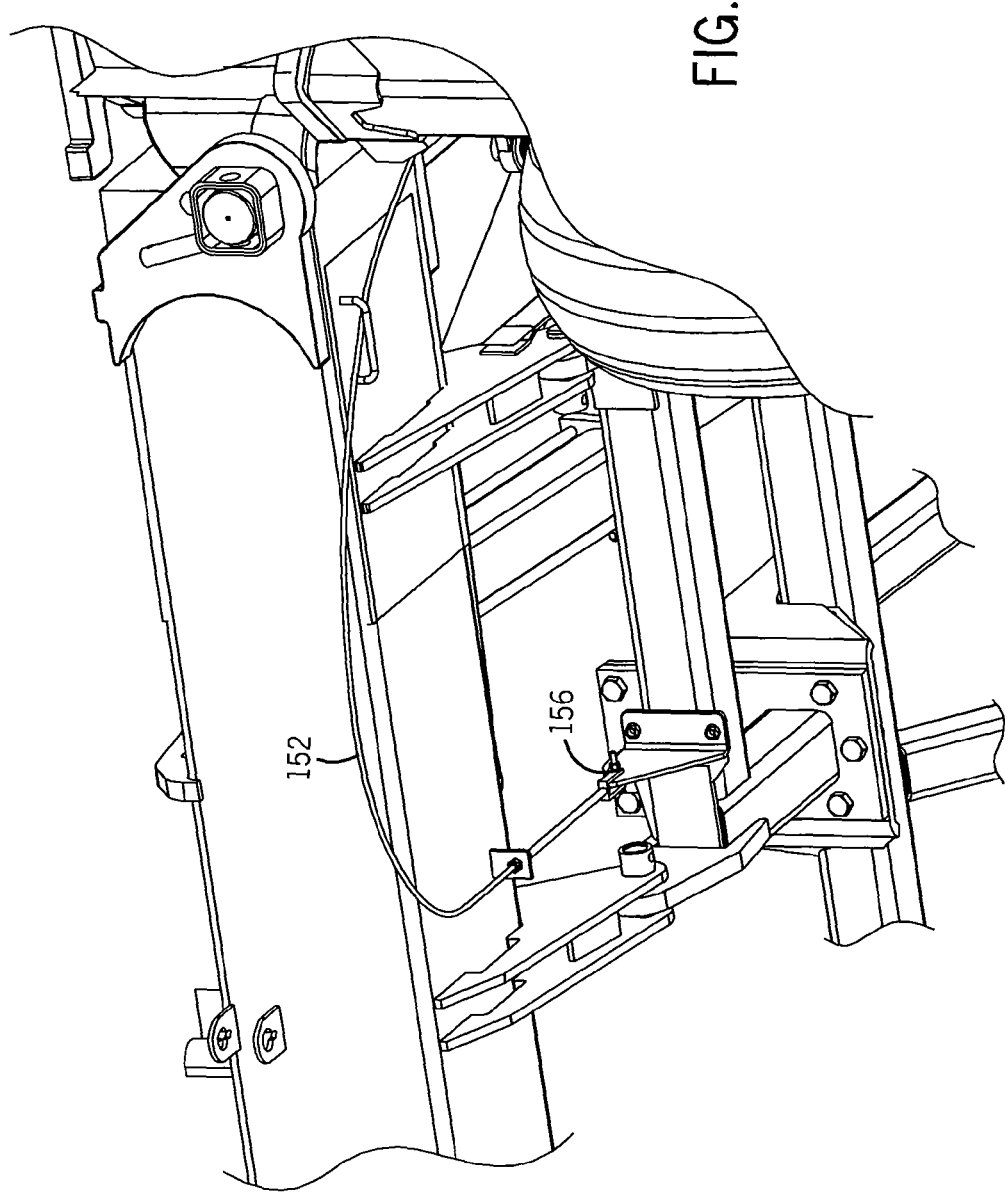

As described above, one of the drawbacks of conventional foldable implements is the possibility that the implement frame could be unintentionally lowered while in the transport position. If the valves are switched to the field setting while the implement is transitioning, or is already in, the transport position, the implement frame could be free to pivot and lower without control. To prevent such an occurrence, the present invention provides a lockout arrangement 150, which is best illustrated in FIGS. 7A and 7B.

The lockout arrangement 150 generally consists of a push-pull cable 152 and a sliding pin 154. The sliding pin 154 is attached to an end of the push-pull cable 152 adjacent the rockshaft 112. The opposite end of the push-pull cable 152 is attached, at point 156, to one of the wing sections, such as sub-frame 46.

Alternately, the push-pull cable 152 could be attached to sub-frame 54. In either case, when the implement is in the field position, e.g., the wing sections 16, 18 are unfolded and all sub-frames are lowered, such as illustrated in FIG. 2, the center tool bar and the wing booms are generally parallel to the ground and is free to rotate approximately 15 degrees away from or toward the ground to account for changes in ground contours, field obstructions, and the like. When the operator desires to place the implement in its transport position, the operator activates control lever 120 which causes rotation of the rockshaft 112. As the rockshaft 112 rotates, the positions of the valves 104-110 change, as described above. In one preferred embodiment, after the control lever has been activated to change the valves to the "transport" setting, the operator activates the remote control that causes the right-hand side sub-frame to rotate over the wing boom 30 followed by swinging in of the wing boom 30

Figure 11:
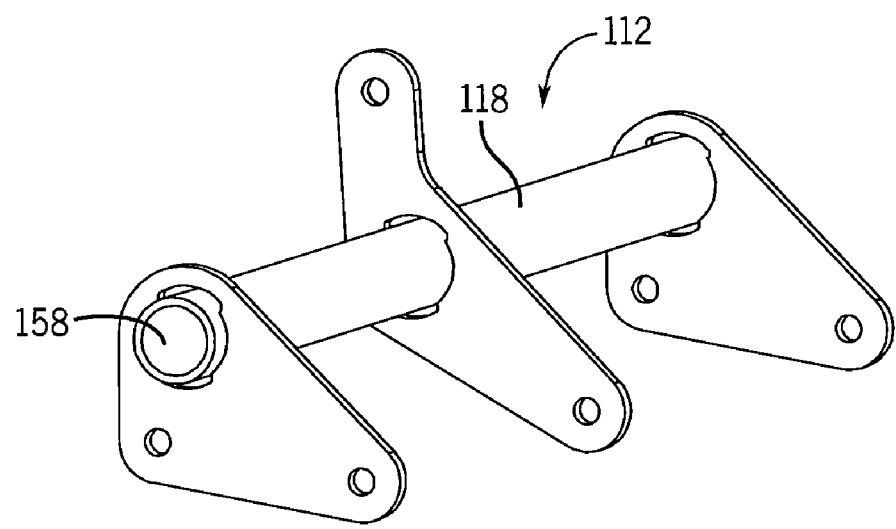
FIG. 11 is an isometric view of a valve-actuating rockshaft of the drill shown in FIG. 2.
Figure 12:
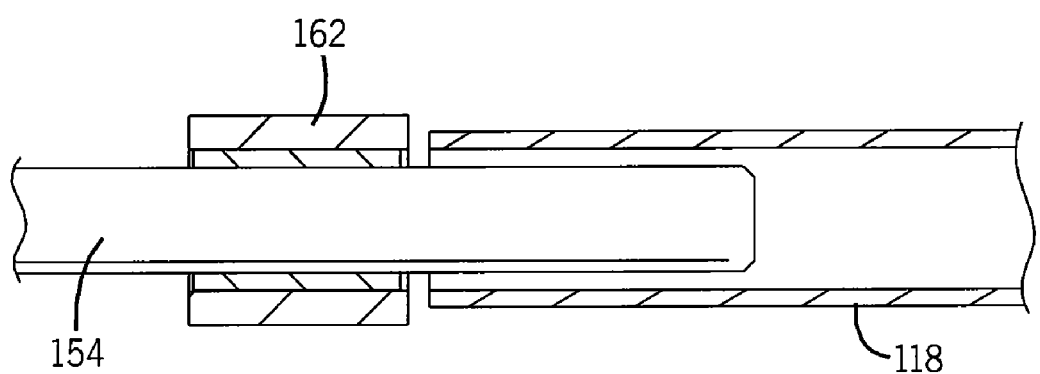
FIG. 12 is a section view taken along line 12-12 of FIG. 7A.

As sub-frame 46 is rotated, the lockout arrangement 150 of the present is activated. More particularly, as sub-frame 46 rotates over tool bar 30, the attached end of the push-pull cable 152 pushes the cable inward, i.e., toward the rockshaft 112. With continued rotation of the sub-frame, the pin 154 moves toward a bore 158, FIG. 11, formed in an end of the rockshaft 112. When the sub-frame 46 has reached its fully rotated position, the pin 154 will slide into the rockshaft 112 thereby preventing rotation of the rockshaft 112. As a result, if the control lever 120 were to be activated while the implement is folding or has been folded, the rockshaft 112 will not be allowed to rotate. Since the rockshaft 112 is prevented from rotating, the valves controlled by rotation of the rockshaft 112 cannot change positions. Most importantly, since valves V1 and V2 are closed when the rockshaft 112 rotated by movement of the control lever 120 to the transport setting, locking out rotation of the rockshaft 112 prevents unintentional movement of the rockshaft 112 to the "working" setting via movement of the control lever 120. Since hydraulic fluid cannot flow, the implement cannot rotate or pivot as may otherwise occur without the lockout arrangement 150 of the present invention. When the implement is unfolded, the pin 154 will automatically be withdrawn from the rockshaft 112 which allows the rockshaft 112 to rotate when the control lever is moved to the "working position".

The lockout arrangement 150 includes a flange 160 mounted to the tool bar 20 and adjacent to the bore 158 formed in the end of the rockshaft 112. The flange 160 carries a bushing 162 that aligns with bore 158 when the rockshaft 112 is rotated to the transport position. The pin 154 slides within bushing 162 as the wing section 16 is folded. As described above, when fully folded, the pin 154 will slide through the bushing 162 into the bore 158 of the rockshaft 112. Since the bushing 162 is mounted to the flange 160, which is fixedly attached to the tool bar 20, rotation of the rockshaft 112 will be prevented when pin 154 is positioned within the bore 158.

It will be appreciated that the present invention provides a hydraulic circuit for use with a farm implement, such as a hoe drill, which provides a number of performance benefits over conventional hydraulic circuits or systems. The hydraulic circuit is arranged and configured to sequence the raising and lowering and folding and unfolding of the implement in a predefined, orderly manner. Weight transfer to the frames of the implement, opener tip force and packing force, and raising/lowering of the frames and transitioning between field and transport position can be controlled using a single remote. Using a single remote also provides a preferred sequencing of the application/removal of weight to the frames and raising/lowering of the implement. In one embodiment, a single remote control can be used to control both a frame lowering/raising circuit and a boom swing circuit. Further, according to another aspect of the invention, a valve lockout arrangement is provided to prevent the flow of hydraulic fluid to the cylinders that raise and lower the openers when the implement is in, or being transitioned to, the transport position.

Many changes and modifications could be made to the invention without departing from the spirit thereof. The scope of these changes will become apparent from the appended claims.

Many changes and modifications could be made to the invention without departing from the spirit thereof. The scope of these changes will become apparent from the appended claims.

I claim:

1. A hydraulic control apparatus for an agricultural implement, the implement having a stationary frame and a number of foldable frame sections pivotably coupled to the stationary frame, and a plurality of ground engaging tools mounted to the stationary frame and foldable frame sections, the apparatus comprising:
   a fluid supply port for coupling to a fluid supply line of a towing vehicle;
   a fluid return port for coupling to a fluid return line of the towing vehicle;
   a first hydraulic system that controls raising/lowering, providing trip force and down force to the ground engaging tools, the first hydraulic system in fluid communication with the fluid supply port and the fluid return port, and including a first set of electronically controlled hydraulic valves; and
   a second hydraulic system that controls folding and unfolding of the foldable frame sections, the second hydraulic system in fluid communication with the fluid supply port and the fluid return port, and including a second set of electronically controlled hydraulic valves.

2. The apparatus of claim 1 further comprising a single remote hydraulic control operative to control operation of the first set of electronically controlled hydraulic valves and the second set of electronically controlled hydraulic valves.

3. The apparatus of claim 2 wherein the first and the second hydraulic systems are configured such that an instruction from the single remote hydraulic control to unfold the foldable frame sections causes the first hydraulic system to prevent weight transfer to the ground engaging tools until the second hydraulic control system has completed unfolding of the foldable frame sections.

4. The apparatus of claim 2 wherein the first and the second hydraulic systems are configured such that that an instruction from the single remote hydraulic control to lower the ground engaging tools into a ground engaging position causes the first hydraulic system to transfer weight to the ground engaging tools and further causes a disabling of the second hydraulic system.

5. The apparatus of claim 4 wherein the second hydraulic system is configured to remain disabled until the first hydraulic system has been instructed by the single remote hydraulic control raise the ground engaging tools from the ground engaging position.

6. The apparatus of claim 5 wherein the first and the second hydraulic systems are configured such that an instruction from the single remote hydraulic control to fold the foldable frame section causes the first hydraulic system to raise the ground engaging tools from the ground engaging position and thereafter causes the second hydraulic system to fold the foldable frame section.

7. The apparatus of claim 6 wherein the first hydraulic system comprises a first plurality of cylinders mounted to the stationary frame and foldable frame sections, and configured to lower the ground engaging tools into the ground engaging position.

8. The apparatus of claim 7 wherein the second hydraulic system comprises a second plurality of cylinders interconnected between the sub-frames and wing booms, and a third plurality of cylinders interconnected between the stationary frame section and the foldable frame sections, and configured to raise and lower the foldable frame sections to fold and unfold the foldable frame sections.

9. The apparatus of claim 8 wherein the first set of electronically controlled hydraulic valves includes first and second solenoid controlled shut-off valves fluidly coupled to the second and third plurality of cylinders and operative to control the flow of hydraulic fluid between a fluid source and the first plurality of cylinders.

10. The apparatus of claim 9 wherein the second set of electronically controlled hydraulic valves includes an arrangement of solenoid controlled sequencing valves.

11. The apparatus of claim 8 further comprising an accumulator to which fluid may be delivered to temporarily relieve pressure in the second plurality of cylinders when a field obstruction is encountered during towing of the implement.

12. A hydraulic control system for use with an agricultural implement frame, the frame having a center frame section and first and second wing sections mounted to opposite lateral sides of the center frame section, and further having ground engaging tools mounted to the center frame section and the wing sections, the system comprising:
a first set of hydraulic cylinders mounted to the implement frame and configured to lower the ground engaging tools into a ground engaging position;
a first set of solenoid controlled valves associated with the first set of hydraulic cylinders and configured to control flow of pressurized hydraulic fluid to the first set of hydraulic cylinders;
a second and third set of hydraulic cylinders mounted to the implement frame configured to fold and unfold the first and second wing sections;
a second set of solenoid controlled valves associated with the second and third set of hydraulic cylinders and configured to control flow of pressurized hydraulic fluid to the second set of hydraulic cylinders; and
a hydraulic control operative to control the first set of solenoid controlled valves to disable the first set of hydraulic cylinders when the wing sections are being moved to a folded position by the second set of hydraulic cylinders and is further operative to control the second set of solenoid controlled valves to disable the third set of hydraulic cylinders when the ground engaging tools are in the ground engaging position.

13. The hydraulic control system of claim 12 wherein the remote hydraulic control is further operative to re-pressurize the second set of hydraulic cylinders when there is internal leakage in the second set of valves when the wing sections are in the folded position.

14. The hydraulic control system of claim 13 wherein the first set of solenoid controlled valves includes shut-off valves and wherein the second set of solenoid controlled valves includes an arrangement of sequencing valves that control the flow of hydraulic fluid to the second and third set of hydraulic cylinders in a predefined order such that the first wing section is raised to its folded position before the second wing section is raised to its folded position.

15. The hydraulic control system of claim 14 wherein the hydraulic control is further operative to close the first set of solenoid controlled valves when the second set of actuators are raising or lowering the wing sections.

16. The hydraulic control system of claim 15 wherein the hydraulic control is further configured to set the second set of solenoid controlled valves to a predetermined state when the first set of actuators have lowered the ground engaging tools to the ground engaging position.

17. The hydraulic control system of claim 12 further comprising first and second solenoid controlled pressure reducing/relieving valves or a combination of valves that function as pressure reducing/relieving valves that can be selectively opened and closed to allow the hydraulic control to independently set how much weight is transferred to the implement frame and how much trip pressure is applied on the ground engaging tools.

18. An agricultural implement comprising:
a tool bar having a stationary frame section adapted to be coupled to a towing vehicle and first and second wing sections pivotably coupled to opposite lateral sides of the stationary frame section;
a plurality of ground engaging tools mounted to the tool bar; and
an electronically controlled hydraulic control system for controlling movement of the tool bar, the control system having:
a fluid supply port for coupling to a fluid supply line of a towing vehicle;
a fluid return port coupling to a fluid return line of the towing vehicle;
a first set of hydraulic cylinders interconnected between the tool bar and the plurality of ground engaging tools, and configured to move the plurality of ground engaging tools between a working position and a ground engaging position;
a second set of hydraulic cylinders interconnected between the front of the tool bar and the sub-frames, and configured to apply downforce to the sub-frames and raise/lower the sub-frames; and
a third set of hydraulic cylinders interconnected between stationary frame section and the first and second wing sections, and configured to move the wing sections between the working position and a folded position; and
a single remote hydraulic control operative to control operation of the first set of hydraulic cylinders and the second set of hydraulic cylinders.

19. The implement of claim 18 wherein the single hydraulic control is further operative to disable the first set of hydraulic cylinders when the wing sections are being moved to a folded position by the second and third set of hydraulic cylinders and is further operative to disable the third set of hydraulic cylinders when the ground engaging tools are in the ground engaging position.

20. The implement of claim 19 further comprising a first set of solenoid controlled valves associated with the first set of hydraulic cylinders and configured to control flow of pressurized hydraulic fluid to the first set of hydraulic cylinders and further comprising a second set of solenoid controlled valves associated with the second set of hydraulic cylinders and configured to control flow of pressurized hydraulic fluid to the second set of hydraulic cylinders, and wherein the remote hydraulic control is further operative to re-pressurize the second set of hydraulic cylinders when there is internal leakage in the second set of valves when the wing sections are in the folded position; and
wherein the first set of solenoid controlled valves includes shut-off valves and wherein the second set of solenoid controlled valves includes an arrangement of sequencing valves that control the flow of hydraulic fluid to the second and third set of hydraulic cylinders in a predefined order such that the first wing section is raised to its folded position before the second wing section is raised to its folded position; and
wherein the hydraulic control is further operative to close the first set of solenoid controlled valves when the second set of actuators are raising or lowering the wing sections.

* * * * *